ALEXANDER SILVER,
INVENTOR.

BY John H.J. Wallace

March 12, 1963 A. SILVER 3,080,713
LOAD CONTROL VALVE FOR GAS TURBINE COMPRESSORS
Filed March 23, 1960 2 Sheets-Sheet 2
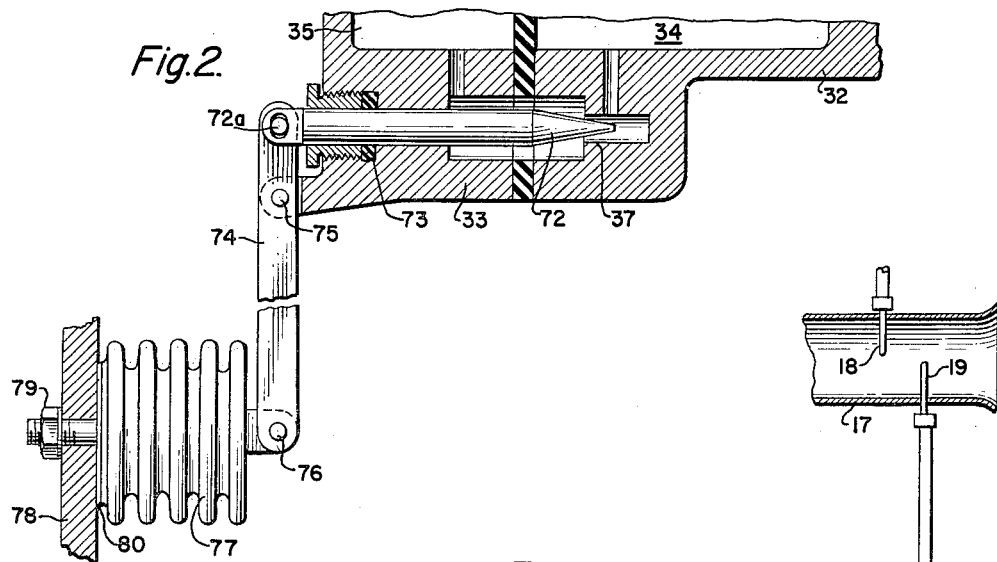
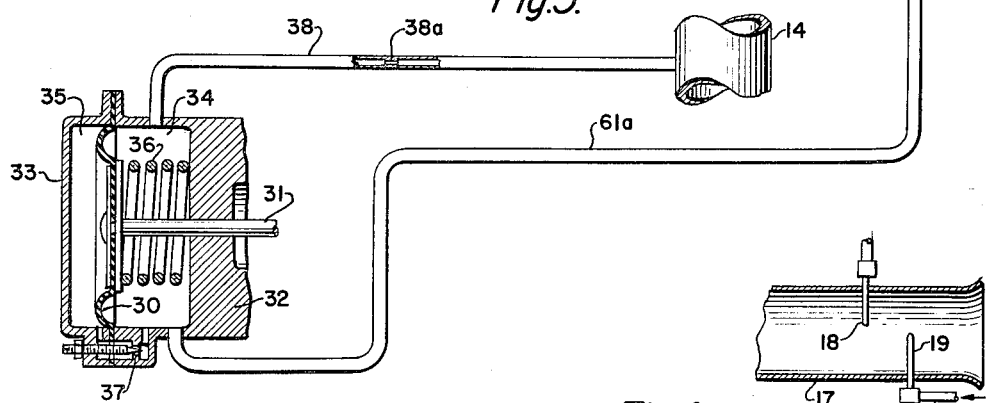
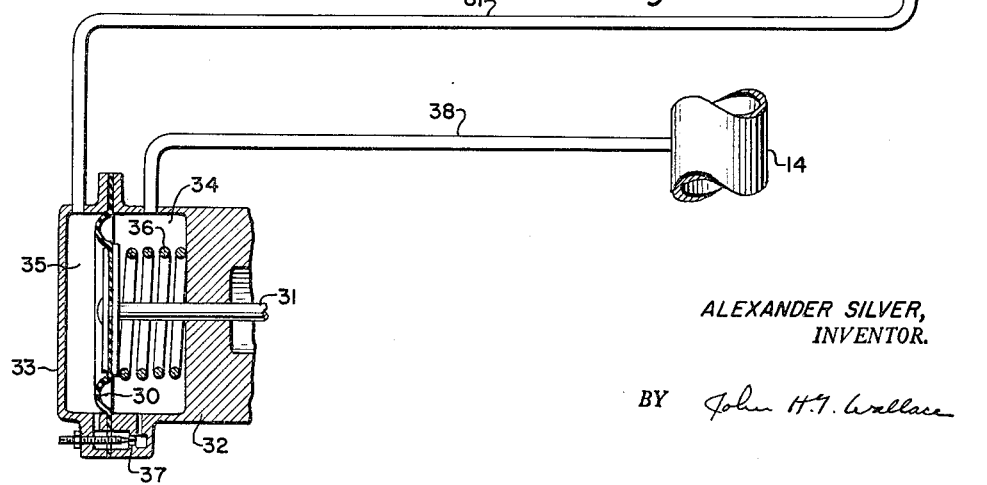
ALEXANDER SILVER,
INVENTOR.
BY John H. J. Wallace United States Patent Office 3,080,713
Patented Mar. 12, 1963

3,080,713
LOAD CONTROL VALVE FOR GAS TURBINE
COMPRESSORS
Alexander Silver, East Woodland Hills, Calif., assignor to
The Garrett Corporation, Los Angeles, Calif., a corporation of California
Filed Mar. 23, 1960, Ser. No. 17,221
24 Claims. (Cl. 60—39.29)

This invention relates to pressure control valves and more particularly to a compressor output pressure control valve adapted to cooperate with a gas turbine driven compressor unit.

This application is a continuation-in-part of my application Serial No. 400,638 filed December 28, 1953, entitled, Load Control Valve for Gas Turbine Compressors, now abandoned.

Gas turbine compressors, as the term is used herein, are gas turbine engines having turbine driven compressors and in which all or part of the useful power output is deliverable in the form of compressed air bled from the compressor of the gas turbine engine in an amount beyond that required by the machine to effect its operation.

The act of bleeding air from the compressor of a gas turbine engine reduces the pressure available for the combustion chamber, thereby momentarily reducing the speed of the machine. In the governing systems of conventional gas turbine engines the turbine fuel system is usually controlled by engine speed or output pressure of the compressor section and turbine combustion or exhaust temperature. With such an arrangement the abrupt initiation of bleed from the compressor section causes a pressure drop at the turbine combustor, resulting in a drop in speed, and the fuel system responds thereto by adding more fuel, thereby tending to increase turbine speed and restore compressor output to compensate for the bleed therefrom. As fuel is added to the turbine combustor, the turbine may operate under an overload condition until a temperature sensing thermostat again reduces the fuel being supplied. Such thermal adjustment to a temporary bleed overload requires considerable time until equilibrium is reached, due to the thermal inertia of the turbine mechanism. Variation in turbine speed due to load changes creates undesirable operational and maintenance conditions within the turbine hot wheel and the governor cooperating therewith. The foregoing conditions of operation are undesirable when a gas turbine compressor is delivering pneumatic power and at the same time is driving an alternator or other device requiring substantially constant speed.

According to the present invention, a compressor output pressure control valve disposed at a gas turbine compressor outlet regulates the pneumatic output flow therefrom in accordance with the pressure therein, whereby the initiation of bleed of air from the compressor output does not cause an appreciable reduction in turbine operating pressure or speed but permits the turbine governing system to gradually increase compressor output to match additional pneumatic load imposed thereon by the bleed from the compressor. The increase in compressor output is limited only by a maximum allowable turbine temperature, which is sensed by a thermostat cooperating with the compressor output pressure control valve which is thereby caused to modulate compressor bleed flow to prevent exceeding the maximum turbine temperature. Thus the valve is controlled by a combination of cooperative temperature and pressure sensing devices for conserving compressor output pressure and limiting turbine temperature.

The present compressor output pressure control valve employs a reference pressure chamber communicating through an orifice with the compressor output duct. Hence slight reduction of compressor output pressure, due to pneumatic bleed therefrom, causes the reference pressure in said chamber to react in opposition to the reduced output pressure. This will cause a valve to close for limiting bleed flow from the compressor output until the slight reduction in compressor output pressure affects the compressor controls which thereby tend to gradually increase the output of the compressor to match the bleed air requirement. When the compressor output pressure is slightly reduced, due to pneumatic bleed therefrom, pressure in the reference pressure chamber gradually diminishes because of leakage of air through an orifice back to the compressor output duct. This reduction of pressure in the chamber permits the valve to open gradually for delivering increased flow from the compressor. The reference pressure chamber under all conditions is subject only to compressor output pressure and is therefore not directly affected by ambient pressure changes encountered during operation of the gas turbine compressor at various altitudes.

It is an object of the present invention to provide a compressor output pressure control valve for gas turbine compressors which tends to temporarily maintain compressor output pressure within a certain range regardless of the initiation of pneumatic bleeding from the compressor output.

Another object of the invention is to provide a compressor output pressure control valve for gas turbine compressors which employs a reference pressure chamber communicating through an orifice with the compressor output pressure, whereby a slight pressure reduction at the compressor output is compared with the reference pressure in the chamber for actuating a valve to limit flow from the compressor output.

Another object of the invention is to provide a turbine compressor output pressure control valve which limits bleeding of air from the compressor output until the compressor output starts to increase in response to the gas turbine control and which then gradually permits increased air bleeding from the correspondingly increased compressor output.

Another object of the invention is to provide a compressor output pressure control valve for gas turbine compressors which is not adversely affected by ambient pressure changes.

Another important object of the invention is to provide a novel method for controlling the flow of pneumatic power from a gas turbine compressor whereby excessive pressure reduction at the gas turbine combustor is prevented.

A further object of the invention is to provide a compressor output pressure control valve for gas turbine compressors which protects the turbine from overload conditions when air is bled from the compressor output.

A further object of the invention is to provide a compressor output pressure control valve which stabilizes the control system of a gas turbine compressor and thereby prevents excessive wear of the controls.

An additional object of the invention is to provide a compressor output pressure control valve for a gas turbine compressor which conserves or maintains its speed and pneumatic operating pressure during initiation of bleeding of air from the compressor output.

A still further object of the invention is to provide, in combination with a compressor output pressure control valve, a vent valve which automatically reduces residual pressure in conduits downstream from the control valve when it is closed, whereby ducts communicating with the compressor output conduit may be opened without the hazard which may be entailed by residual duct pressure above ambient pressure.

Another object of the invention is to provide a compressor output pressure control valve for gas turbine compressors which is controlled by a combination of pressure and temperature sensing devices for automatically limiting compressor output flow and turbine temperature.

A further additional object of the invention is to provide a compressor output pressure control valve which modulates compressor output flow to an air motor or the like, whereby the pneumatic load on the same is gradually applied.

Additional objects of the invention will be apparent from the following specification, claims and drawings, in which:

FIG. 2 is an enlarged fragmentary sectional view of a modification having ambient pressure and temperature responsive means for adjusting the opening rate of the control valve;

FIG. 3 is a view of a modified arrangement of the turbine temperature sensing thermostat relative to the control valve; and FIG. 4 is a view showing a further modified arrangement of the turbine temperature sensing thermostat.

Figure 1:
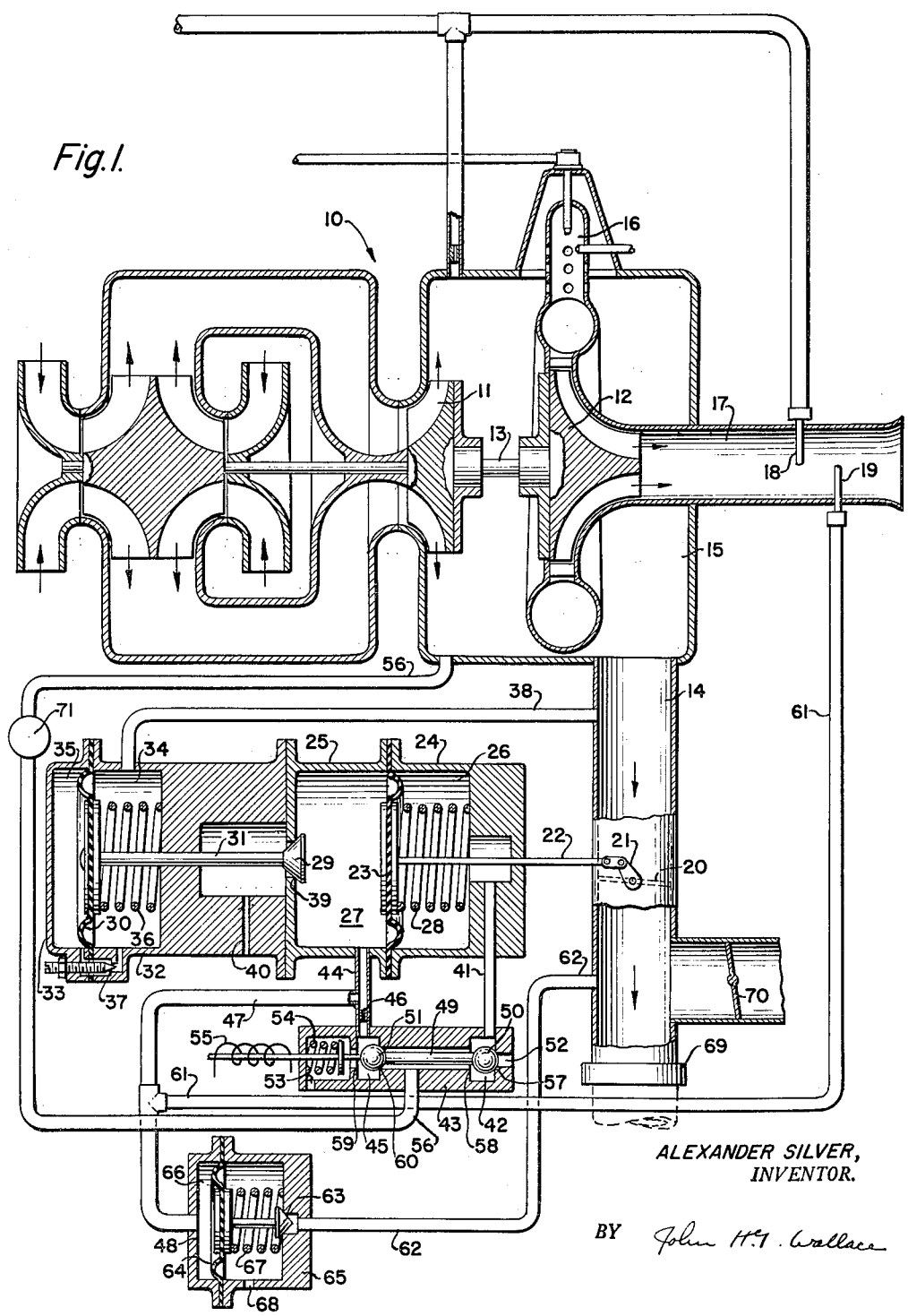
FIG. 1 is a diagrammatic view of a gas turbine compressor having the compressor output pressure control valve of the present invention in operative relationship therewith, and illustrating portions of the gas turbine and the valve in section.

As shown in the drawing, a conventional gas turbine compressor 10 includes a compressor 11 which may have several stages as shown and a turbine 12 coupled together by a shaft 13. The output of the compressor 11 communicates with a conduit 14 through the plenum 15 from which compressed air passes into the turbine combustor 16. Gaseous products of combustion pass from the combustor 16 through the turbine wheel and outwardly through an exhaust stack 17 in which temperature sensing thermostats 18 and 19 are located. The conduit 14 and plenum 15 serve as compressor output duct or conduit means. A valve 20 is positioned in the conduit 14 and is adapted to control the flow of compressor output air therethrough. This valve 20 as shown is a butterfly type valve; however, other equivalent structures may be used in place thereof. Connected to the butterfly valve 20 is a bell crank 21 which is pivotally connected to one end of a link 22 having an opposite end secured to a diaphragm 23. The diaphragm 23 is mounted between casing elements 24 and 25 which provide pneumatic chambers 26 and 27, respectively. Mounted in the chamber 26 is a spring 28 which engages the diaphragm 23 and tends to force it toward the chamber 27. Communicating with the chamber 27 is a valve 29 which is connected to a diaphragm 30 by means of a stem 31. The diaphragm 30 is mounted between casing elements 32 and 33 which form chambers 34 and 35, respectively. Positioned in the chamber 34 is a spring 36 which tends to move the diaphragm 30 toward the chamber 35. The chamber 35 is a reference pressure chamber and it communicates with chamber 34 through an adjustable orifice 37 which forms the only passage through which the reference pressure chamber 35 may receive compressed air. Chamber 34 is essentially a compressor output pressure sensing chamber or, as hereinafter referred to, an operating pressure chamber which communicates with the conduit 14 by means of a tube 38. The valve 29, when opened by the diaphragm 30, is adapted to vent the chamber 27 to atmosphere through the valve seat 39 and a passage 40. Communicating with the chamber 26 of the casing element 24 is a tube 41 which, at its opposite end, communicates with a chamber 42 in a solenoid valve body 43. Communicating with the chamber 27 is a tube 44 which, at its opposite end, communicates with a chamber 45 in the valve body 43. A restricted orifice 46 is disposed in the tube 44 intermediate the valve body 43 and a branch tube 47 which communicates with a chamber 66 formed in a casing member 48. Positioned in the valve body 43 is a solenoid valve 49, having seating elements 50 and 51 adapted to control flow to atmosphere, through the vents 52 and 53, respectively. To this end the atmospheric vent 52 communicates with the seating element 50 of the solenoid valve, while the atmospheric vent 53 communicates with the seating element 51 of the solenoid valve. A spring 54 tends to maintain the seating element 50 closed with respect to the atmospheric vent 52 while a solenoid winding 55 is adapted, when energized, to unseat the seating element 50 from the atmospheric vent 52. Communicating with the valve body 43 at a location between the chambers 42 and 45 is a tube 56 which receives air at the compressor output pressure existing in the plenum 15. Thus compressor output air is conducted to the interior of the valve body 43 by means of the tube 56. This compressed air may pass through the tube 41 into the chamber 26 when the seating element 50 of the solenoid valve engages the seat 57 and closes the atmospheric vent 52. When the solenoid winding 55 is energized and the seating elements 50 and 51 are forced to engage their respective seats 58 and 59, air from the compressor is admitted through the tubes 56 and 44 to chamber 27. The valve body 43 is provided with a seat 60 which is engageable by the seating element 51 to divert compressed air from the tube 56, through the chamber 42 and tube 41, to the chamber 26. A pressure regulator 71 is disposed in the tube 56 to maintain constant supply pressure at the valve 43.

The turbine temperature sensing thermostat 19 communicates with a tube 61 which is connected with the tube 47. The thermostat 19 is a conventional thermostat adapted to vent the tube 61 to atmosphere when exhaust gases from the turbine 12 reach a predetermined temperature. Communicating at one end with the conduit 14 downstream from the valve 20 is a tube 62 which, at its opposite end, communicates with a valve 63 actuated by a diaphragm 64 peripherally clamped between casing members 48 and 65. The casing member 48 forms the pressure chamber 66 at one side of the diaphragm 64 and a spring 67 tends to force the diaphragm 64 toward the chamber 66. The casing member 65 is provided with a vent 68 which communicates with atmosphere and the valve 63, whereby compressed air trapped downstream of the valve 20, when the valve 20 is closed, may be vented through the tube 62 and valve 63 to atmosphere. Downstream of the valve 20 the conduit 14 is provided with a coupling 69 adapted for use in connected ducts to the conduit 14 as desired. This coupling 69, when disconnected, permits exposure of the entire cross-sectional area of the conduit 14, and therefore it is necessary to insure the maintenance of very low pressure differential with respect to atmosphere in the conduit 14, downstream of the valve 20, before opening the coupling 69.

The operation of the compressor output pressure control valve according to the present invention is substantially as follows:

When the gas turbine compressor, comprising the compressor 11 and turbine 12, is started, considerable time is required to build up turbine speed and air temperature and also a corresponding compressor output pressure. Until the gas turbine compressor unit has acquired sufficient combustion temperature and speed, the valve 20 is maintained in closed position. As compressor output pressure builds up in the conduit 14, plenum 15, and tube 38, the air pressure is conducted to the chambers 34 and 35 by the tube 38. Air pressure in chambers 34 and 35 will be equalized through the passage containing orifice 37. The tube 56 admits air under pressure fixed by the regulator 71 to the solenoid valve 49. The application of energy to the solenoid valve 49 may be controlled in any suitable manner. When the solenoid valve 49 is energized, the seating elements 50 and 51 move away from the position shown in the drawing to a position wherein the seating elements 50 and 51 engage the seats 58 and 59, respectively. In such position, compressor output air in the tube 56 passes through the valve chamber 45, orifice 46 and tube 44, and into the chamber 27 adjacent the diaphragm 23. Compressor output air conducted to the chamber 27 causes the diaphragm 23 to move toward the chamber 26, exhausting air therefrom through the tube 41 and atmospheric vent 52. When the diaphragm 23 moves toward the chamber 26, it actuates the bell crank 21 and moves valve 20 connected therewith, toward open position.

As the valve 20 opens, compressed air flows through the conduit 14 past the valve 20. This flow tends to reduce pressure in the conduit 14 and plenum 15, which correspondingly reduces pressure in the chamber 34 communicating through the tube 38 with the plenum 15. When pressure is reduced in the chamber 34, a pressure differential exists across the diaphragm 30, due to the fact that the original compressor output pressure still exists in the chamber 35. When such a pressure differential exists across the diaphragm 30, the diaphragm will flex in opposition to the force of spring 36 and tend to force the valve 29 from its seat 39 to permit flow of compressed air from the chamber 27 to atmosphere through the passage 40. The passage 40 has greater flow capacity than the orifice 46 in tube 44 and therefore dissipates pressure from the chamber 27 faster than it can be built up by flow through the orifice 46. Such reduction of pressure in the chamber 27 relieves the diaphragm 23 and permits the spring 28 to force the diaphragm 23 toward the chamber 27, whereupon the valve 20 is moved toward a closed position. This general sequence of operation occurs each time the pressure drops slightly in the conduit 14. The pressure drop is determined relative to the existing reference pressure in the chamber 35, which is the compressor output pressure as it existed before the pressure drop.

It should be obvious that any relatively sudden demand for air from conduit 14 will have a tendency to reduce the pressure therein. For example, if a valve 70 in a conduit communicating with conduit 14 downstream of valve 20 is opened when the latter valve is open, the pressure in conduit 14 will tend to drop and the control mechanism will be put into operation as described.

It will be understood that after pressure in chamber 34 falls the orifice 37 permits the reference pressure in the chamber 35 to gradually dissipate and balance with the slightly reduced pressure in the chamber 34. As the pressures in chambers 34 and 35 become equalized, spring 36 moves valve 29 into closed position, and compressor output air flowing through tube 56, chamber 45, orifice 46, and tube 44 to chamber 27 will be trapped, causing the pressure to build up again in the latter chamber. The force of this air pressure applied to diaphragm 23 will urge the diaphragm to move against the force of spring 28 and cause valve 20 to again move toward an open position. The restricted dissipation of air from chamber 35 through orifice 37 permits the valve 20 to open very gradually in proportion to increased load. The time element attendant to the gradual change of reference pressure in the chamber 35, when bled therefrom through the orifice 37, is adjusted to correspond with the time element involved in control adjustment of the gas turbine compressor, during which more fuel is normally added to the combustor 16 in response to a reduction of compressor output pressure. The limitation of flow through the conduit 14, by the valve 20, corresponds to the inherent gradual opening operation thereof when it responds to downstream bleed demands. Opening of the valve 20 should be effected in a period of time to correspond with a thermal adjustment of the turbine 12. The turbine 12 absorbs considerable heat before its efficiency rises to an extent which permits it to transmit additional power to the compressor 11 for increasing the output thereof in proportion to the pneumatic bleed which may be taken through valve 70.

In the event the pneumatic bleed load is excessive after the compressor output pressure control valve has gradually increased the bleed capacity, as hereinbefore described, added fuel consumed by the combustor 16 will cause an over-temperature condition to exist in the exhaust stack 17 downstream from the turbine wheel 12. The thermostat 19 responds to the overtemperature, causing a pressure reduction in the tube 61 which is more rapid than pressure can be increased across the orifice 46 with reference to the chamber 27. This operational condition causes the pressure in the chamber 27 to be reduced, permitting the spring 28 to force the diaphragm 23 toward the chamber 27, tending to move the valve 20 toward a closed position. Slight closing of the valve 20 causes an increase in compressor output pressure within the plenum 15. In conventional gas turbines an increase in compressor output pressure above a predetermined value normally causes a reduction in fuel supplied to the combustor 16. Thus the thermostat 19, in its operation as above described, prevents the thermal overload from continuing and thereby protects the turbine wheel 12 from excessive temperature.

When it is desired to connect another conduit or hose to the conduit 14, the coupling 69 must be opened; therefore, the solenoid winding 55 is de-energized, permitting the spring 54 to force the solenoid valve 49 to the position shown in the drawing. In this position compressor output air passes through the tube 56 and the tube 41 into the chamber 26, which actuates the diaphragm 23 toward the chamber 27. The chamber 27 is relieved of pressure through the orifice 46 and vent 53 which communicates with the open seat 59, and thus the valve 20 is positively closed. Residual pressure downstream from the valve 20 may be hazardous to any person releasing the coupling 69, and therefore means is provided to dissipate such pressure as soon as the valve 20 is closed. This means includes the solenoid valve 49 which in de-energized condition is in the position shown in the drawing, wherein the orifice 46 and vent 53 communicate with the tube 47 which, at its opposite end, communicates with the diaphragm 64. Air in the chamber 66 at one side of the diaphragm 64 is then exhausted through the tube 47, orifice 46 and atmospheric vent 53. The spring 67 overcomes reduced pressure in the chamber 66 and forces the diaphragm 64 toward the chamber 66 and the valve 63 away from its seat, permitting residual pressure in the conduit 14, downstream of the valve 20, to be exhausted through the tube 62 and atmospheric vent 68. Automatic dissipation of the residual pressure downstream from the valve 20 reduces the hazard accompanying the opening of the coupling 69 which is provided for connection of ducts or hoses normally employed to conduct compressed air from the compressor 11 to a use location.

It will be noted that the spring loading of the diaphragm 64 is less than the spring loading of the diaphragm 23, so that the valve 63 is closed by lower supply pressure in the chamber 66 than that required in the chamber 27 to open the valve 20. Thus the valve 63 will always be closed before the valve 20 opens. This arrangement prevents bleeding of air through the valve 63 when the valve 20 is opened.

The modification shown in FIG. 2 relates particularly to the structure of the orifice 37 disclosed in FIG. 1. In general, the modified structure provides for an adjustment of the orifice 37, in accordance with ambient air temperature and pressure, to compensate for the rate at which thermal acceleration takes place in the gas turbine compressor during bleeding of air therefrom through the valve 20. It will be understood that during low temperature ambient conditions the temperature of the turbine wheel 12 will rise more slowly and therefore take more time to reach maximum output than at high ambient air temperatures. For this reason it is necessary, under some circumstances, to adjust the orifice 37 in accordance with ambient conditions.

As shown in FIG. 2, the orifice 37 is adjustable by means of a needle valve element 72 which is slideable in a bore 73 of the casing 33 in which an O-ring provides a seal around the needle valve element 72. Pivotally connected to the needle valve 72 by means of a pin 72a is a lever 74 which is mounted on a fulcrum pin 75. Pivotally connected to the opposite end of the lever by means of a pin 76 is a gas filled ambient air responsive bellows 77 which is stationarily supported on a rigid member 78 by means of a bolt 79. A shim 80 is provided for adjustment of the lever in order to maintain a certain initial optimum setting of the tapered portion of the needle valve 72 relative to the orifice 37.

In operation, an increase in temperature tends to expand the bellows 77 and cause pivotal movement of the lever 74, which moves the tapered needle valve 72 out of the orifice 37 for increasing the flow area therethrough, whereby such increased flow area corresponds to a shorter time period required for the turbine to reach its maximum temperature under higher temperature ambient condition. The bellows 77 is also affected by low ambient pressures and temperatures existing at high altitude. When the gas turbine compressor is operating at a low ambient air temperature, the bellows 77 contracts and reduces the flow area of the orifice 37 to correspond to a longer time necessary for the turbine to reach its maximum operating temperature. Thus the modified structure shown in FIG. 2 provides an automatic adjustment of the orifice 37 in response to ambient conditions whereby the pressure equalization flow rate from the chamber 35 to the chamber 34 corresponds under all conditions to the rate at which the turbine wheel 12 reaches its maximum operating temperature.

The modification disclosed in FIG. 3 provides for thermostatic control of the valve 20 when the turbine reaches its maximum operating temperature and permits such control to be exercised in connection with the chamber 34 adjacent the diaphragm 30. The thermostat 19, when it senses a maximum temperature, vents air through the tube 61a and thereby exhausts air from the chamber 34. An orifice 38a restricts flow through the tube 38 from the conduit 14 and thereby prevents pressure from rebuilding in the chamber 34 as rapidly as it is vented therefrom by the thermostat 19. When the thermostat 19 thus creates a pressure drop in the chamber 34 the reference pressure in the chamber 35 forces the diaphragm 30 toward the chamber 34 and causes actuation of the poppet valve 29, as hereinbefore described in connection with the structure disclosed in FIG. 1. It will be understood that the modification shown in FIG. 3 provides for an alternate means of employing the thermostat 19 in cooperative relationship with the load control valve 20.

The modification of FIG. 4 relates to a further alternative use of the thermostat 19 for influencing the operation of the valve 20 when the turbine reaches its maximum operating temperature. The thermostatic valve 19, as shown in FIG. 4, is provided with a tube 82 which supplies compressed air at a higher pressure than the compressor output pressure existing in the conduit 14. Thus when the temperature sensing thermostat 19 is heated to a temperature corresponding to the maximum operating temperature of the turbine 12, the high pressure air from the tube 82 is conducted into the tube 81 and chamber 35 where it acts upon the diaphragm 30, tending to force it toward the chamber 34 and thereby to actuate the poppet valve 29, for accomplishing the operation hereinbefore described in connection with the structure shown in FIG. 1. It will be understood that the pressure in the chamber 34 is the compressor output pressure, while higher pressure applied to the chamber 35 readily causes actuation of the poppet valve 29. The compressed air may be supplied to the tube 82 by any suitable means as desired.

It will be noted that a novel method for controlling the flow of pneumatic power from a gas turbine compressor attends the operation of the above described control valve. This method prevents an excessive pressure drop at the combustor of a gas turbine compressor when pneumatic power is initially drawn from the compressor communicating therewith.

The method comprises: first establishing a normal compressor output pressure; then confining the normal pressure in the chamber 35 and using it as a reference pressure in relation to any subsequent reduction in compressor output pressure sensed in the chamber 34; and then employing the pressure differential across the diaphragm 30 to influence the valve 20 to modulate flow through the conduit 14 to prevent excessive pressure reduction at the combustor of the gas turbine. Furthermore, a gradual reduction of reference pressure in the chamber 35 is effected by means of the orifice 37, which is adjusted to function in correspondence with the thermal acceleration rate of the gas turbine compressor. Thus modulating operation of the valve 20 is reduced as the compressor output increases to meet the demand for flow of pneumatic power therefrom.

I claim:

1. In a mechanism for controlling bleed flow from a gas turbine compressor: a valve formed for disposition in a bleed flow output conduit leading from a compressor to control pneumatic bleed flow through such conduit; first means having a reference pressure chamber provided with a restricted inlet communicating with the bleed flow output conduit, said inlet also serving as the sole outlet from said reference pressure chamber; second means having a chamber for communication with the bleed flow output conduit to receive compressor output pressure, said reference pressure chamber and said compressor output pressure receiving chamber both receiving bleed flow from the same region in the bleed flow output conduit upstream of said valve; a movable wall between said chambers, said wall having substantially equal areas exposed to the pressures in said chambers; and third means operable by said movable wall in response to an expansion of fluid in said reference pressure chamber to control said valve.

2. In a compressor output pressure control mechanism for controlling bleed flow from a gas turbine compressor: a valve formed for disposition in a bleed flow output conduit leading from a compressor to control pneumatic bleed flow through said conduit; first means having a reference pressure chamber provided with a restricted inlet communicating with the bleed flow output conduit, said inlet also serving as the sole outlet from said reference pressure chamber; second means having a compressor output pressure receiving chamber communicating with the bleed flow output conduit, said reference pressure chamber and said compressor output pressure receiving chamber both communicating with a region of common pressure in said bleed flow output conduit upstream of said valve; a movable wall between said chambers and having opposed surfaces thereof exposed to fluid pressures in said chambers; a second movable wall connected with said valve; third means for applying opposing forces to said second movable wall; and fourth means operable by said first-mentioned movable wall for varying the forces applied to said second movable wall to cause closing actuation of said valve in response to an increase in bleed flow which reduces pressure in the bleed flow output conduit.

3. In a compressor output pressure control mechanism for controlling bleed flow from a gas turbine compressor: a valve formed for disposition in a bleed flow output conduit leading from a compressor to control pneumatic bleed flow through such conduit; first means having a reference pressure chamber provided with a restricted inlet communicating with the bleed flow output conduit, said inlet also serving as the sole outlet from said reference pressure chamber; second means having a compressor output pressure receiving chamber communicating with the bleed flow output conduit, said reference pressure chamber and said compressor output pressure receiving chamber both communicating with a region of common pressure in said bleed flow output conduit upstream of said valve; a movable wall between said chambers and having opposed surfaces thereof exposed to fluid pressures in said chambers; a second movable wall connected with said valve; spring means tending to move said valve toward one position; third means for supplying pneumatic pressure tending to move said second wall and said valve to an opposite position; and a second valve connected with said first-mentioned movable wall for venting said pneumatic pressure from said second movable wall whereby said first-mentioned valve is operated in one direction by said spring means.

4. In a compressor output pressure control mechanism for controlling bleed flow from a gas turbine compressor: a valve formed for disposition in a bleed flow output conduit leading from a compressor to control pneumatic bleed flow through such conduit; first means having a reference pressure chamber provided with a restricted inlet communicating with the bleed flow output conduit, said inlet also serving as the sole outlet from said reference pressure chamber; second means having a compressor output pressure receiving chamber communicating with the bleed flow output conduit, said reference pressure chamber and said compressor output pressure receiving chamber both communicating with a region of common pressure in said bleed flow output conduit upstream of said valve; a movable wall between said chamber and exposed on opposite sides thereof to fluid pressures in said chambers; a second movable wall arranged to operate said valve; means for applying opposing pneumatic forces on said second movable wall; and a second valve operated by said first movable wall for relieving the pneumatic force acting in one direction on said second wall.

5. In a compressor output pressure control mechanism for controlling bleed flow from a gas turbine compressor: a valve formed for disposition in a bleed flow output conduit leading from a compressor to control pneumatic bleed flow through such conduit; first means having a reference pressure chamber provided with a restricted inlet communicating with the bleed flow output conduit, said inlet also serving as the sole outlet from said reference pressure chamber; second means having a compressor output pressure receiving chamber communicating with the bleed flow output conduit, said reference pressure chamber and said compressor output pressure receiving chamber both communicating with a region of common pressure in said bleed flow output conduit upstream of said valve; a movable wall between said chambers and exposed on opposite sides to the pressures in said chambers; a second movable wall arranged to operate said valve; third means for alternately applying opposing pneumatic forces to said second movable wall, a second valve operated by said first movable wall for relieving the pneumatic force acting in one direction on said second wall; and springs tending to close said first- and second-mentioned valves.

6. In a compressor output pressure control mechanism for controlling bleed flow from a gas turbine compressor: a valve formed for disposition in a bleed flow output conduit leading from a compressor to control pneumatic bleed flow through the conduit; first means having a reference pressure chamber provided with a restricted inlet communicating with the bleed flow output conduit; second means having a compressor output pressure receiving chamber communicating with the bleed flow output conduit, said reference pressure chamber and said compressor output pressure chamber both communicating with a region of common pressure in said bleed flow output conduit upstream of said valve; a movable wall between said chambers; a second movable wall arranged to operate said valve; third means for alternately applying opposing pneumatic forces to said second movable wall; and a second valve operated by said first-mentioned movable wall for relieving pneumatic force acting on said second wall in one direction, said third means including a solenoid valve for selectively directing said pneumatic forces to said second-mentioned movable wall.

7. In a compressor output pressure control mechanism for controlling bleed flow from a gas turbine compressor: a valve formed for disposition in a bleed flow output conduit leading from a compressor to control pneumatic bleed flow through the conduit; first means having a compressor output pressure sensing chamber communicating with said bleed flow output conduit; second means having a reference pressure chamber, said reference pressure chamber and said compressor output pressure sensing chamber both communicating with a region of common pressure in said bleed flow output conduit upstream of said valve; a diaphragm between said chambers and providing a pneumatic seal therebetween; an orifice means intercommunicating with both of said chambers and adapted to provide a gradual transfer of pneumatic force from one chamber to the other, said orifice means being the only passage for fluid to pass into and out of said reference pressure chamber; and third means connected with said diaphragm for controlling the operation of said valve.

8. In a compressor output pressure control mechanism for controlling bleed flow from a gas turbine compressor: a valve formed for disposition in a bleed flow output conduit leading from a compressor to control pneumatic bleed flow through the conduit; first means having a compressor output pressure sensing chamber communicating with said bleed flow output conduit; second means having a reference pressure chamber, said reference pressure chamber and said compressor output pressure sensing chamber both communicating with a region of common pressure in said bleed flow output conduit upstream of said valve; a diaphragm between said chambers and providing a pneumatic seal therebetween; an orifice means intercommunicating with both of said chambers and adapted to provide a gradual transfer of pneumatic force from one chamber to the other, said orifice means being the only passage for fluid to flow into and out of said reference pressure chamber; a second diaphragm connected with said valve; third means for creating opposing forces on said second diaphragm; and fourth means operable by said first-mentioned diaphragm for creating a force differential on said second diaphragm and thereby causing actuation of said valve in response to a decrease of pressure in said bleed flow output conduit.

9. In a compressor output pressure control mechanism for controlling bleed flow from a gas turbine compressor: a valve formed for disposition in a bleed flow output conduit leading from a compressor to control pneumatic bleed flow through the conduit; first means having a compressor output pressure sensing chamber communicating with said bleed flow output conduit; second means having a reference pressure chamber, said reference pressure chamber and said compressor pressure sensing chamber both communicating with a region of common pressure in said bleed flow output conduit upstream of said valve; a diaphragm between said chambers and providing a pneumatic seal therebetween; an orifice means intercommunicating with both of said chambers and adapted to provide gradual transfer of pneumatic force from one chamber to the other, said orifice means being the only passage for fluid to flow into and out of said reference pressure chamber; a second diaphragm connected with said valve; spring means tending to move said valve toward one position; third means for applying pneumatic pressure tending to move said second diaphragm and valve to an opposite position; and a second valve connected with said first-mentioned diaphragm for venting said pneumatic pressure from said second diaphragm whereby said first-mentioned valve is operated in one direction by said spring means.

10. In a compressor output pressure control mechanism for controlling bleed flow from a gas turbine compressor: a valve formed for disposition in a bleed flow output conduit leading from a compressor to control pneumatic bleed flow through the conduit; first means having a compressor output pressure sensing chamber communicating with the bleed flow output conduit; second means having a reference pressure chamber, said reference pressure chamber and said compressor output pressure sensing chamber both communicating with a region of common pressure in said bleed flow output conduit upstream of said valve; a diaphragm between said chambers and providing a pneumatic seal therebetween; an orifice means intercommunicating with said reference pressure chamber and said bleed flow output conduit, said orifice means being the only passage for fluid to flow into and out of said reference pressure chamber; a second diaphragm arranged to operate said valve; third means for alternately applying opposing pneumatic forces on said second diaphragm; and a second valve operable by said first-mentioned diaphragm for relieving pneumatic forces acting on said second diaphragm in one direction.

11. In a compressor output pressure control mechanism for controlling bleed flow from a gas turbine compressor: a valve formed for disposition in a bleed flow output conduit leading from a compressor to control pneumatic bleed flow through the conduit; first means having a compressor output pressure sensing chamber communicating with said bleed flow output conduit; second means having a reference pressure chamber, said reference pressure chamber and said compressor output pressure sensing chamber both communicating with a region of common pressure in said bleed flow output conduit upstream of said valve; a diaphragm between said chambers and providing a pneumatic seal therebetween; an orifice means intercommunicating with said reference pressure chamber and said bleed flow output conduit, said orifice means being the only passage for fluid to flow into and out of said reference pressure chamber; a second diaphragm arranged to operate said valve; third means for alternately applying opposing pneumatic forces on said second diaphragm; a second valve operable by said first-mentioned diaphragm for relieving pneumatic force acting on said second diaphragm in one direction; and fourth means tending to close said first- and second-mentioned valves.

12. In a compressor output pressure control mechanism for controlling bleed flow from a gas turbine compressor: a valve formed for disposition in a bleed flow output conduit leading from a compressor to control pneumatic bleed flow through the conduit; first means having a compressor output pressure sensing chamber communicating with the bleed flow output conduit; second means having a reference pressure chamber said reference pressure chamber and said compressor output pressure sensing chamber both communicating with a region of common pressure in the bleed flow output conduit upstream of said valve; a diaphragm between said chambers and providing a pneumatic seal therebetween; an orifice means intercommunicating with said reference pressure chamber and said bleed flow output conduit; a second diaphragm arranged to operate said valve; third means for alternately applying opposing pneumatic forces on said second diaphragm; and a second valve operable by said first diaphragm for relieving pneumatic force acting on said second diaphragm in one direction, said third means including a solenoid valve for directing pneumatic forces to said second diaphragm.

13. The combination comprising a gas turbine compressor having a compressor, a combustor, a turbine operatively connected with said compressor, and a bleed flow output conduit leading from the compressor; a valve formed for disposition in the bleed flow output conduit to control pneumatic bleed flow through the conduit; first means having a reference pressure chamber with a restricted inlet communicating with the bleed flow output conduit upstream of said valve, said inlet also serving as the sole outlet from said reference pressure chamber; second means having a compressor output pressure receiving chamber communicating with the bleed flow output conduit upstream of said valve, said reference pressure chamber and said compressor output pressure receiving chamber both communicating with the same pressure region; a movable wall between said chambers; a second movable wall disposed to operate said valve; means for applying opposing pneumatic forces on said second movable wall; a second valve operable by said first movable wall for relieving pneumatic force acting in one direction on said second wall; and a thermostat communicating with said turbine for sensing excessive temperature thereof and adapted to relieve pneumatic force acting in one direction on said second wall.

14. A compressor output pressure control mechanism for controlling bleed flow from a gas turbine compressor comprising: a valve formed for connection with a bleed flow output conduit leading from a compressor to control pneumatic bleed flow through the conduit; first means having a reference pressure chamber provided with a restricted inlet, said inlet also serving as the sole outlet from said reference pressure chamber; second means having an operating pressure chamber, said chambers both communicating with the upstream side of said valve and receiving bleed flow at compressor output pressure; a movable wall between said chambers; third means operable by said movable wall arranged to control said valve; and a thermostat adapted to be located adjacent a turbine outlet and operatively connected to effect closing movement of said valve to reduced bleed flow and thus limit turbine temperature.

15. A compressor output pressure control mechanism for controlling bleed flow from a gas turbine compressor comprising: a valve formed for disposition in a bleed flow output conduit leading from a compressor to control pneumatic bleed flow through the conduit; first means having a reference pressure chamber provided with a restricted inlet, said inlet also serving as the sole outlet from said reference pressure chamber; second means having an operating pressure chamber, said reference pressure chamber and said operating pressure chamber both communicating with the upstream side of said valve and receiving bleed flow at compressor output pressure; a movable wall between said chambers; third means operable by said movable wall arranged to control said valve; and a thermostat communicating with one of said chambers, said thermostat being adapted to be positioned adjacent a turbine and operative to effect a pressure change on said movable wall in response to a predetermined maximum temperature of the gas turbine.

16. A mechanism for controlling bleed flow from a gas turbine compressor comprising: a valve formed for disposition in a bleed flow output conduit leading from a compressor to control pneumatic bleed flow through the conduit; first means having a reference pressure chamber provided with a restricted inlet, said inlet providing the sole outlet from said reference pressure chamber; second means having an operating pressure chamber, said reference pressure chamber and said operating pressure chamber both communicating with the inlet side of said valve and receiving bleed flow at the compressor output pressure; a movable wall between said chambers; third means operable by said movable wall to control said valve; and thermostatic means communicating with one of said chambers to effect a pressure change on said movable wall, said thermostatic means being adapted to be located adjacent to and operative in response to a maximum temperature of the gas turbine, said thermostatic means communicating with said reference pressure chamber and a source of pressure higher than the gas turbine compressor output pressure.

17. A mechanism for controlling bleed flow from a gas turbine compressor comprising: a valve formed for disposition in a bleed flow output conduit leading from a compressor to control pneumatic bleed flow through the conduit; first means having a reference pressure chamber provided with a restricted inlet, said inlet providing the sole outlet from said reference pressure chamber; second means having an operating pressure chamber, said reference pressure chamber and said operating pressure chamber both communicating with a region of common pressure in said bleed flow output conduit at the upstream side of said valve; a movable wall between said chambers; third means operable by said movable wall to control said valve; thermostatic means communicating with one of said chambers to effect a pressure change on said movable wall, said thermostatic means being adapted to be located adjacent to a turbine and operative in response to a maximum temperature thereof, said thermostatic means communicating with said operating pressure chamber; and means for restricting the passage of pressure from the inlet side of said valve to said operating pressure chamber.

18. A mechanism for controlling bleed flow from a gas turbine compressor comprising: a valve formed for disposition in a bleed flow output conduit leading from a compressor to control pneumatic bleed flow through the conduit; first means having a reference pressure chamber provided with a restricted inlet, said inlet also serving as the sole outlet from said reference pressure chamber; second means having an operating pressure chamber, said reference pressure chamber and said operating pressure chamber both communicating with a region of common pressure in said bleed flow output conduit at the upstream side of said valve; a movable wall between said chambers; third means operable by said movable wall to control said valve; and fourth means responsive to ambient temperature for adjusting the flow capacity of said restricted inlet.

19. A mechanism for controlling bleed flow from a gas turbine compressor comprising: a valve formed for disposition in a bleed flow output conduit leading from a compressor to control pneumatic bleed flow through the conduit; first means having a reference pressure chamber provided with a restricted inlet, said inlet also serving as the sole outlet from said reference pressure chamber; second means having an operating pressure chamber communicating with the bleed flow output conduit, said reference pressure chamber and said operating pressure chamber both communicating with a region of common pressure in said bleed flow output conduit; a movable wall between said chambers; third means operable by said movable wall arranged to control said valve; and fourth means responsive to ambient temperature and pressure for adjusting the flow capacity of said restricted inlet.

20. In combination with a compressor and a compressor bleed flow output conduit: a bleed flow control valve disposed to control flow through said conduit; a vent valve communicating with said conduit downstream of said control valve; first pressure responsive means, disposed to move said vent valve, said first pressure responsive means being responsive to fluid pressure to close said vent valve; first resilient means tending to open said vent valve; second pressure responsive means disposed to move said control valve, said second pressure responsive means being responsive to fluid pressure to open said control valve; second resilient means tending to close said control valve; and a third valve for venting fluid pressure from said first and second pressure responsive means upon a predetermined pressure reduction upstream of said control valve thereby permitting said first and second resilient means simultaneously to open said vent valve and to close said control valve, respectively.

21. In combination with a compressor and a compressor bleed flow output conduit: a bleed flow control valve disposed to control flow through said conduit; a vent valve communicating with said conduit downstream of said control valve; first pressure responsive means disposed to move said vent valve, said first pressure responsive means being responsive to fluid pressure to close said vent valve; first resilient means tending to open said vent valve; second pressure responsive means disposed to move said control valve and having a first surface, said first surface being responsive to fluid pressure to open said control valve; said second pressure responsive means having a second surface, said second surface being responsive to fluid pressure to close said control valve; second resilient means tending to close said control valve; and a third valve disposed for simultaneously venting fluid pressure from said first pressure responsive means and from said first surface of said second pressure responsive means, said third valve also conducting fluid under pressure to said second surface thereby permitting said first and second resilient means simultaneously to open said vent valve and to close said control valve, respectively, fluid pressure acting on said second surface serving to assist said second resilient means to close said control valve.

22. In combination with a compressor and a compressor bleed flow output conduit having a pneumatic fluid under pressure therein: a bleed flow control valve disposed to control fluid flow through said conduit; a vent valve communicating with said conduit downstream of said control valve; first pressure responsive means communicating with said conduit and responsive to fluid pressure therein tending to close said vent valve; first resilient means tending to open said vent valve; second pressure responsive means communicating with said conduit and responsive to fluid pressure therein tending to open said control valve; second resilient means tending to close said control valve; and a third valve selectively operative to vent said pneumatic fluid from said first and second pressure responsive means thereby permitting said first and second resilient means simultaneously to open said vent valve and to close said control valve, respectively.

23. A mechanism for controlling bleed flow from a gas turbine compressor comprising: a valve adapted to be connected with a compressor bleed duct to control flow therethrough, said valve having an inlet and an outlet; a first means having a pair of chambers separated by a movble wall, one of said chambers constituting a reference pressure chamber and the other a bleed pressure sensing chamber; a second means establishing restricted communication between said chambers, said second means also serving as the sole outlet from said reference pressure chamber; a third means establishing communication between said bleed pressure sensing chamber and the inlet of said valve; a fluid pressure responsive actuator operatively connected with said valve; and a fourth means operable by said movable wall to control the application of fluid pressure to said fluid pressure responsive valve actuator, an increase in pressure in said bleed pressure sensing chamber effecting an application of pressure to said fluid pressure responsive actuator to open said valve and vice versa.

24. A mechanism for controlling bleed flow from a gas turbine compressor comprising: a valve adapted to be connected with a compressor bleed duct to control flow therethrough, said valve having an inlet and an outlet; a first means having a pair of chambers separated by a movable wall, one of said chambers constituting a reference pressure chamber and the other a bleed pressure sensing chamber; a second means establishing restricted communication between said chambers, said second means also serving as the sole outlet from said reference pressure chamber; means for varying the restricted communication between said chambers; a third means establishing communication between said bleed pressure sensing chamber and the inlet of said valve; a fluid pressure responsive actuator operatively connected with said valve; and a fourth means operable by said movable wall to control the application of fluid pressure to said fluid pressure responsive valve actuator, an increase in pressure in said bleed pressure sensing chamber effecting an application of pressure to said fluid pressure responsive actuator to open said valve and vice versa.

References Cited in the file of this patent

UNITED STATES PATENTS

| | | |
|---|---|---|
| 2,414,202 | Jepson et al. | Jan. 14, 1947 |
| 2,429,005 | Watson et al. | Oct. 14, 1947 |
| 2,670,598 | Van Millingen | Mar. 2, 1954 |
| 2,808,702 | Dotson | Oct. 8, 1957 |
| 2,873,576 | Lombard | Feb. 17, 1959 |
| 2,886,968 | Johnson et al. | May 19, 1959 |

UNITED STATES PATENT OFFICE
CERTIFICATE OF CORRECTION

Patent No. 3,080,713            March 12, 1963

Alexander Silver

It is hereby certified that error appears in the above numbered patent requiring correction and that the said Letters Patent should read as corrected below.

Column 4, line 49, for "connected" read -- connecting --; column 6, lines 17 and 18, for "withing" read -- within --; column 8, line 50, for "said" read -- such --; column 9, line 34, for "chamber" read -- chambers --; column 12, line 35, for "reduced" read -- reduce --.

Signed and sealed this 15th day of October 1963.

(SEAL)
Attest:

ERNEST W. SWIDER
Attesting Officer

EDWIN L. REYNOLDS
Acting Commissioner of Patents